United States Patent [19]
Jensen

[11] Patent Number: 5,739,434
[45] Date of Patent: Apr. 14, 1998

[54] FORMED METAL DIAPHRAGM WITH IMPROVED CYCLE LIFE

[75] Inventor: Frank E. Jensen, Marshalltown, Iowa

[73] Assignee: Fisher Controls International, Inc., Clayton, Mo.

[21] Appl. No.: 735,508

[22] Filed: Oct. 23, 1996

[51] Int. Cl.[6] .................................. G01L 7/02; G01L 7/10
[52] U.S. Cl. ......................................................... 73/730
[58] Field of Search .......................... 92/98 R, 96, 103 F, 92/103 M, 104, 142; 29/454; 251/214, 225, 335.2; 137/183; 73/730

[56] References Cited

U.S. PATENT DOCUMENTS

| | | | |
|---|---|---|---|
| 2,632,475 | 3/1953 | Elo | 137/791 |
| 3,874,636 | 4/1975 | Bake et al. | 251/335 |
| 4,171,792 | 10/1979 | Bass | 251/335 A |
| 5,335,584 | 8/1994 | Baird | 92/98 R |

OTHER PUBLICATIONS

"The Trerice Metal Diaphragm", *Introduction To The Trerice Metal Diaphragm Its Design and Application*, Trerice Co., Michigan, pp. 7–13, 18–19, 22.

"Leslie–Spiroflex® and Cage Trim Combined in a New Line of Steel Pressure Reducing Valves", *Regulators and Controllers*, Leslie Co., New Jersey, pp. 1–4.

*Primary Examiner*—William L. Oen
*Attorney, Agent, or Firm*—Marshall, O'Toole, Gerstein, Murray & Borun

[57] ABSTRACT

A formed metal diaphragm for use in fluid pressure regulators includes a dome-shaped central portion and a convoluted shaped flexible area. The convoluted shaped flexible area includes a series of radially spaced elliptically shaped impressions in the diaphragm surface. The major elliptic axis of each impression is aligned with a radius emanating from the center of the diaphragm. The minor ellipse axis of the impressions is located on a concentric axis outward from the center of the diaphragm.

8 Claims, 2 Drawing Sheets

FORMED METAL DIAPHRAGM WITH IMPROVED CYCLE LIFE

This invention relates to flexible diaphragms used in pressure instrumentation, and in particular to dome-shaped diaphragms which are flexible so as to react to pressure in fluid pressure regulators.

BACKGROUND OF THE INVENTION

Flexible diaphragms having a dome-shaped center have been in common use in pressure sensing instrumentation. Dome-shaped diaphragms, while providing an increasing amount of diaphragm movement, also cause more stress problems in the diaphragm member.

Typically, such dome-shaped diaphragms are mounted for instance in a fluid pressure regulator by clamping the diaphragm perimeter so that the diaphragm moves in response to a loading pressure. The diaphragms are formed of a thin metal sheet, and for pressure sensing instrumentation, it is desired to provide a maximum amount of surface area of material in the center portion of the diaphragm so that the instrumentation can provide an extended range of diaphragm travel and of the stroking of the associated instrument operating member. However, the need to provide more surface area of material in the center of the diaphragm leads to creating a dome-shaped center diaphragm portion which tends to cause more radial and tangential stress problems in the diaphragm member.

It is therefore desired to provide a dome-shaped diaphragm which is more effective in providing increased travel (stroke) in a fluid pressure regulator, while not causing more radial and tangential diaphragm stress conditions.

SUMMARY OF THE INVENTION

A formed dome-shaped metal diaphragm with improved cycle life is provided for use in pressure sensing instrumentation. A plurality of elliptical impressions are formed around the circumference of the diaphragm to generate convolutions in the flexure area of the diaphragm so as to distribute the stresses around the entire circumference of the diaphragm.

In particular, the diaphragm is formed with elliptically shaped intermittent impressions in the diaphragm surface provided at a 15° radial spacing about the central perpendicular axis of the diaphragm. Each elliptical impression is about 0.020 inch (0.51 mm) deep. The elliptic impressions are located on the diaphragm surface such that the major ellipse axis of the impressions point radially inward toward the center of the diaphragm. Likewise, the minor ellipse axis of the impressions is located concentrically outward from the center of the diaphragm, so that the minor ellipse axis is equidistantly spaced between a diaphragm clamping surface and the outer periphery of a diaphragm head.

In accordance with the invention, forming the 0.020 inch (0.51 mm) deep elliptically shaped intermittent impressions provide a 0.5 inch (12.7 mm) radius convolution in the annular flexible portion of the diaphragm with the plurality of intermittent impressions at 15° radial spacing around the diaphragm surface. In addition, a concentric circular indentation is stamped into the ¼ to ½ diametric section of the diaphragm to produce a 0.25 inch (6.35 mm) deep dome in the center section of the diaphragm. Accordingly, a more effective diaphragm for use in a fluid pressure regulator is provided with increased travel (stroke) and with reduced diaphragm stress problems to enhance the diaphragm cycle life.

Therefore, in accordance with the principles of the present invention, there is provided a diaphragm having a dome-shaped central portion and a convoluted shaped annular portion in the diaphragm flexure area. The distinct advantages of the diaphragm of the present invention include: (1) increased travel (stroke) due to the domed/convoluted shape; (2) a generally flat and undistorted clamping surface due to the pleating action of the elliptical impressions; and (3) minimal stress and distortion in areas where the diaphragm is required to flex about the diaphragm support head and the clamping surface in the associated diaphragm mounting structure.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

Figure 1:
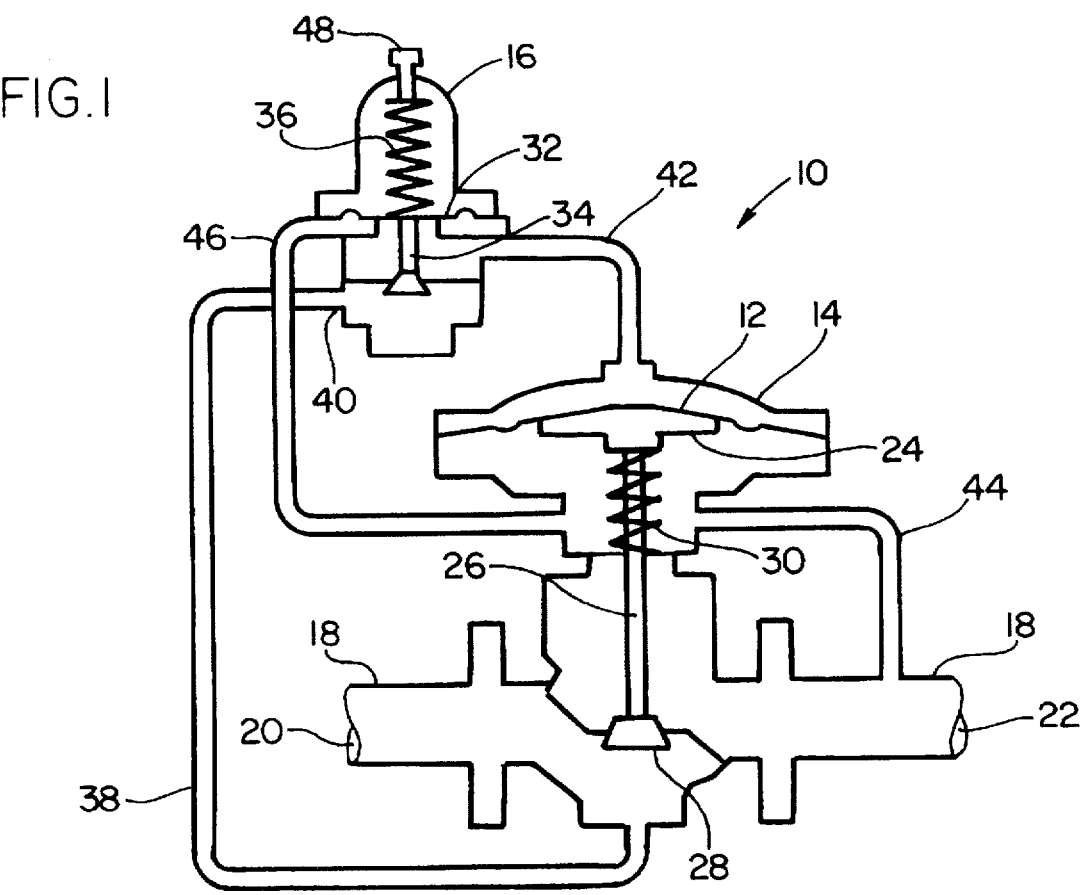
FIG. 1 is a schematic view illustrating a pilot operated fluid pressure regulator which includes a main valve diaphragm in accordance with the present invention.
Figure 2:
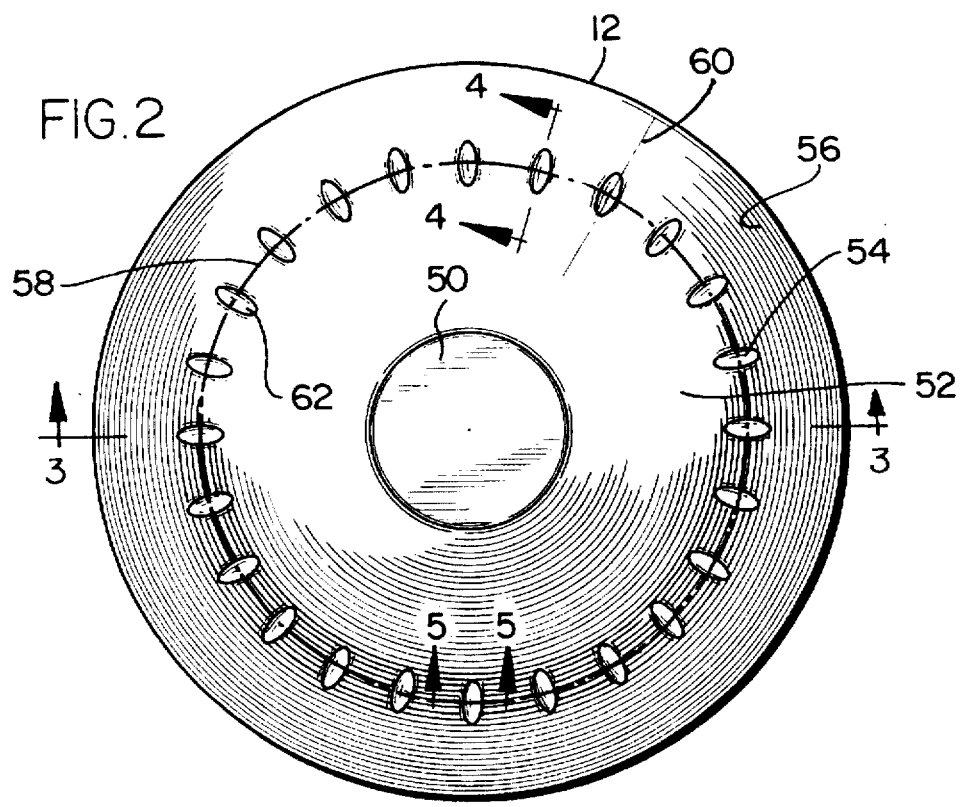
FIG. 2 is a plan view illustrating a diaphragm having a dome-shaped center portion and convolutions in an annular flexure area.
Figure 3:
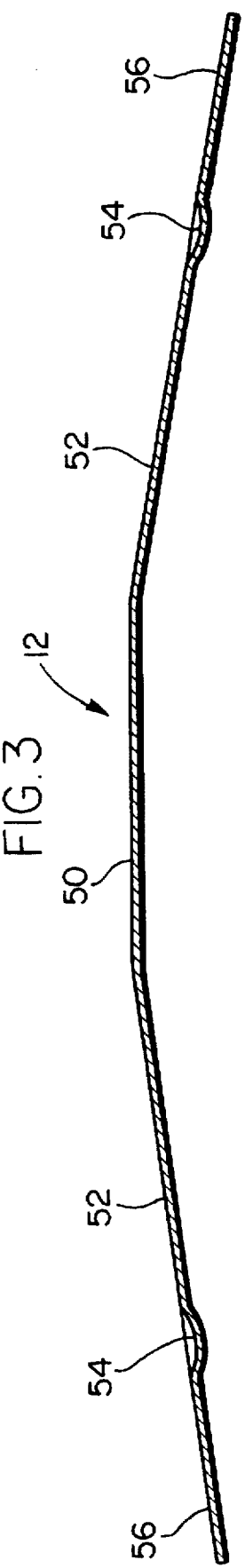
FIG. 3 is a side elevational view of the diaphragm of FIG. 2.

With reference to FIG. 1, there is illustrated a pilot-operated steam pressure regulator 10 which includes a main valve diaphragm 12 constructed in accordance with the principles of the present invention.

It is to be understood, of course, that the following description is for the purpose of providing one example of the invention to fulfill the requirements of the patent laws. Therefore, this specific illustration and application of the diaphragm of the present invention should not be taken as a limitation because it can as well be used in other fluid pressure regulators as well as in other pressure sensing and pressure actuation conditions and instruments.

Accordingly, while FIG. 1 illustrates an application of the improved diaphragm of the present invention in a fluid pressure regulator, FIGS. 2–5 illustrate the construction details of the improved diaphragm 12 per se. The following description of FIG. 1 and the operation of the diaphragm 12 within the regulator 10, while illustrating an improved fluid regulator in accordance with one aspect of the invention, also serves as a basis for understanding the significant improvements included in the diaphragm 12. These improvements will be seen in connection with the description of FIGS. 2–5.

The regulator 10 includes a main regulator valve 14, a pilot valve 16 and various fluid inter-connecting passageways between the pilot valve and the main valve. The regulator 10 is mounted within a pipe-line 18 with the inlet pressure at the upstream side of the pipeline being at inlet 20, and the outlet pressure at the downstream side of the pipeline being at an outlet 22. A diaphragm plate 24 is connected to a valve operating member 26 having a valve plug 28 seating within the main valve and controlling the passage of fluid from the inlet 20 to the outlet 22. A valve spring 30 tends to maintain the valve plug 28 in a closed position.

The pilot valve 16 also includes a small pilot diaphragm 32 and an associated pilot valve plug 34 and pilot spring 36. The inlet fluid pressure is communicated on line 38 from the inlet 20 to the pilot valve inlet 40 and is enabled to flow through an opened pilot valve to a line 42 fluidly communicating with the top of the main diaphragm 12 in the main valve 14. This provides loading pressure on the main diaphragm 12.

Pressure at the outlet 22 is coupled by a line 44 to below the diaphragm 12 within the main body 14 and this same downstream pressure is communicated on a connecting line 46 to an area below the pilot diaphragm 32 in the pilot valve 16.

In the standard operation of the pilot-operated steam pressure regulator 10 shown in FIG. 1, compression of the pilot spring 36 pushes the pilot diaphragm 32 and the pilot valve 34 down and thereby holds the pilot valve plug open. The outlet pressure may be changed by varying the amount of pilot spring compression through an outlet pressure adjustment set screw 48.

When steam enters the inlet 20 of the valve, it also enters the pilot supply line 38 and flows through the opened pilot valve and via line 42 to the top of the main diaphragm 12. The force created by this steam pressure on the diaphragm 12 overcomes the force of the main valve spring 30, thereby opening the valve plug 28 and enabling steam to flow downstream to the outlet 22. Downstream pressure registers under the main diaphragm 12 through the control line 44 and tends to balance the diaphragm. Steam from the downstream system also registers under the pilot diaphragm having been coupled through line 46 to the pilot valve 16. Pressure forces the pilot diaphragm 32 upward, permitting the pilot valve plug 34 to move toward the closed position. This reduces the flow of steam from the pilot valve through line 42 to the top of the main diaphragm 12 and the pressure on the main diaphragm thereby drops. This action raises the main valve plug 28 toward the closed position, allowing only enough steam flow to satisfy downstream requirements.

When steam demand increases, the downstream pressure at the pilot supply line 38 decreases below the setting of the pilot spring 36. The pilot valve 16 opens to increase the pressure on the main diaphragm 12. The main valve 14 opens to increase the flow downstream. Conversely, if the steam demand decreases, the downstream pressure increases which is coupled to the pilot valve on the pilot supply line 38. The pilot valve thus reacts to decreased pressure at the top of the main diaphragm 12. The main valve 14 throttles toward the closed position and the steam flow between the inlet 20 and the outlet 22 thereby decreases.

Thus, through the combination of the operation of the pilot valve 16 and the main valve 14, control of the downstream steam pressure at the outlet 22 is maintained. Furthermore, it can be seen from above that a more effective main diaphragm 12 in the fluid pressure regulator 10, where the diaphragm provides increased travel and thereby increased stroking of the main valve operating member 26 can lead to better performance characteristics of the regulator 10.

Reference may now be made to FIGS. 2–5 wherein there is illustrated a main diaphragm 12 which does provide increased travel (stroke) and which provides improved cycle life. In particular, the improved diaphragm 12 is formed of a metal sheet material and includes a dome-shaped central portion 50 and a surrounding annular, flexible portion 52 including a plurality of intermittent impressions 54. Radially beyond the impressions 54 on the diaphragm 12 there is provided a clamping surface 56 for mounting the diaphragm 12 within the fluid regulator 10.

Each of the impressions 54 is elliptically shaped and about 0.020 inch (0.51 mm) deep, and with the elliptical impressions 54 being placed at about a 15° radial spacing about the central perpendicular axis of the diaphragm 12. As can be seen from FIG. 2, the impressions are located such that the major ellipse axis of each impression 54 is radially aligned with a respective radius emanating from the center of the diaphragm. Also, each of the minor ellipse axes of the impressions 54 is located on a concentric circular axis 58 with respect to the center of the diaphragm. It is desired that the concentric circular axis 58 is equi-distantly spaced between the portion of the clamping surface 56 mounted within the valve body of the main valve 14 and the outer periphery of the diaphragm plate 24.

Figure 4:
FIG. 4 is a sectional view taken along section line 4—4 of FIG. 2.

FIG. 4 illustrates a fragmented sectional view taken along the major elliptic axis. It is preferred that the impressions 54 are formed with a ½inch (12.7 mm) radius convolution with the bottom of the impression being about 0.020 inch (0.51 mm) below the surface of the diaphragm.

Figure 5:
FIG. 5 is a sectional view taken along section line 5—5 of FIG. 2.

FIG. 5 is a sectional view taken along the minor elliptic axis 62. The forming of the impressions 54 provides a radius of about 0.19 inch (4.83 mm) along the minor elliptic axis 62.

The distinct advantages of a diaphragm 12 in accordance with the present invention include: (1) increased diaphragm travel and thereby valve stroking due to the dome/convoluted diaphragm shape; (2) a generally flat and undistorted clamping surface 56 due to the "pleating" action of the elliptical impressions 54; and (3) a minimal amount of stress and distortion in the areas where the diaphragm is required to flex about the diaphragm plate 24 and the clamped portion of clamping surface 56, that is, generally in the area of the annular, flexible portion 52.

A variety of forming techniques may be utilized to provide the diaphragm 12 in accordance with this invention. One forming technique which has been utilized is to clamp full hard 0.005 inch (0.127 mm) thick 302SST sheet stock against a frustrum shaped backing plate, and simultaneously pressing toroidially shaped discs into the material at the desired concentric annular radius. A mating plate is used to hold the toroidal discs perpendicularly on edge against the diaphragm. This forming technique produces a diaphragm with a dome-shaped central portion 50 and a convoluted shape in the annular, flexible portion 52.

The foregoing detailed description has been given for clearness of understanding only, and no unnecessary limitations should be understood therefrom, as modifications will be obvious to those skilled in the art.

What is claimed is:

1. In a fluid pressure regulator including a regulator valve body having a fluid pressure inlet and outlet, a movable valve plug in the regulator valve body intermediate the inlet and outlet, and a flexible diaphragm mounted in the regulator valve body and coupled to the movable valve plug for controlling fluid flow between the inlet and outlet in response to changes in the fluid pressure on opposite side of the diaphragm, the improvement comprising:

said diaphragm being cylindrically shaped with a dome-shaped center portion raised above a surrounding diaphragm annular surface;

a plurality of elliptical shaped impressions in said diaphragm annular surface equally radially spaced around the dome-shaped center portion, each of said elliptical shaped impressions having a major elliptic axis and a minor elliptic axis;

each of the major elliptic axes of said impressions aligned with a respective radius of said diaphragm, and each of the minor elliptic axes of said impressions being located on a common circle concentric with the dome-shaped center portion.

2. A fluid pressure regulator according to claim 1, wherein said diaphragm annular surface surrounding said dome-shaped center portion includes an annular perimeter clamping portion for mounting said diaphragm in said regulator valve body.

3. A fluid pressure regulator according to claim 2, including a flexible surface area on said diaphragm defined between said annular perimeter clamping portion and said dome-shaped center portion.

4. A fluid pressure regulator according to claim 3, wherein said dome-shaped center portion is raised about 0.25 inch (6.35 mm) above the diaphragm annular perimeter clamping portion.

5. A fluid pressure regulator according to claim 4, wherein each of said elliptic impressions is formed with a radius of about 0.50 inch (12.7 mm) along the corresponding major elliptic axis.

6. A fluid pressure regulator according to claim 5, wherein each of said impressions is formed with a radius of not greater than about 0.19 inch (4.83 mm) along the corresponding minor elliptic axis.

7. In a fluid pressure regulator including a regulator valve body having a fluid pressure inlet and outlet, a movable valve plug in the regulator valve body intermediate the inlet and outlet, and a flexible diaphragm mounted in the regulator valve body and coupled to the movable valve plug for controlling fluid flow between the inlet and outlet in response to changes in the fluid pressure on opposite side of the diaphragm, the improvement comprising:

said diaphragm being cylindrically shaped with a dome-shaped center portion raised above a surrounding diaphragm annular surface;

a plurality of elliptical shaped impressions in said diaphragm annular surface intermittently spaced around the dome-shaped center portion, each of said elliptical shaped impressions having a major elliptic axis and a minor elliptic axis;

each of the major elliptic axes of said impressions aligned with a respective radius of said diaphragm, and each of the minor elliptic axes of said impressions being located on a common circle concentric with the dome-shaped center portion.

8. A formed metal diaphragm for use in pressure instrumentation comprising:

a metal diaphragm sheet being cylindrically shaped with a dome-shaped center portion raised above a surrounding diaphragm annular surface;

a plurality of elliptical shaped impressions in said diaphragm annular surface equally radially spaced around the dome-shaped center portion, each of said elliptical shaped impressions having a major elliptic axis and a minor elliptic axis;

each of the major elliptic axes of said impressions aligned with a respective radius of said diaphragm, and each of the minor elliptic axes of said impressions being located on a common circle concentric with the dome-shaped center portion.

* * * * *